United States Patent
Zhang et al.

(10) Patent No.: US 8,406,483 B2
(45) Date of Patent: Mar. 26, 2013

(54) BOOSTED FACE VERIFICATION

(75) Inventors: Cha Zhang, Sammamish, WA (US); Xiaogang Wang, Cambridge, MA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 12/492,417

(22) Filed: Jun. 26, 2009

(65) Prior Publication Data
US 2010/0329517 A1 Dec. 30, 2010

(51) Int. Cl.
*G06K 9/62* (2006.01)

(52) U.S. Cl. .................................. 382/118

(58) Field of Classification Search .............. None
See application file for complete search history.

(56) References Cited

U.S. PATENT DOCUMENTS

| | | |
|---|---|---|
| 2005/0013479 A1 | 1/2005 | Xiao et al. |
| 2006/0062451 A1 | 3/2006 | Li et al. |
| 2007/0112699 A1 | 5/2007 | Zhao et al. |
| 2008/0107311 A1 | 5/2008 | Huang et al. |
| 2008/0166026 A1* | 7/2008 | Huang et al. ............ 382/118 |
| 2008/0298766 A1 | 12/2008 | Wen et al. |
| 2009/0010500 A1 | 1/2009 | Kandaswamy et al. |

OTHER PUBLICATIONS

Liao, et al., "Learning Multi-Scale Block Local Binary Patterns for Face Recognition", Retrieved at <<http://www.sinobiometrics.com/student_corner/Li-Group/ICB07-MB-LBP.pdf>>, Advances in Biometrics, International Conference, ICB 2007, LNCS 4642, Aug. 27-29, 2007, pp. 828-837.

Fehr, et al., "3D Rotation Invariant Local Binary Patterns", Retrieved at <<http://figment.cse.usf.edu/~sfefilat/data/papers/MoCT1.1.pdf>>, In Proceedings of the 19th International Conference on Pattern Recognition, Dec. 8-11, 2008.

Caruana, Rich, "Multitask Learning", Retrieved at <<http://reports-archive.adm.cs.cmu.edu/anon/1997/CMU-CS-97-203.pdf>>, Doctoral Thesis, CMU-CS-97-203, School of Computer Science, Carnegie Mellon University, pp. 255.

Ahonen, et al., "Face Recognition with Local Binary Patterns", Retrieved at <<http://www.springerlink.com/content/p5d9xp9gfkex5gk9/fulltext.pdf>>, In Proceedings of the 8th European Conference on Computer Vision, LNCS 3021, May 11-14, pp. 469-481.

Belhumeur, et al., "Eigenfaces Vs. Fisherfaces: Recognition using Class Specific Linear Projection", Retrieved at <<http://cs.gmu.edu/~kosecka/cs803/pami97.pdf>>, IEEE Transactions on Pattern Analysis and Machine Intelligence, vol. 19, No. 7, Jul. 1997, pp. 711-720.

Freund, et al., "A Decision-Theoretic Generalization of On-Line Learning and an Application to Boosting", Retrieved at <<http://www.face-rec.org/algorithms/Boosting-Ensemble/decision-theoretic_generalization.pdf>>, Journal of Computer and System Sciences, vol. 55, No. 1, Aug. 1997, pp. 119-139.

Guo, et al., "Pairwise Face Recognition", Retrieved at <<http://lcv.stat.fsu.edu/research/geometrical_representations_of_faces/PAPERS/pairwise_face_recognition.pdf>>, In Proceedings of the Eighth IEEE International Conference on Computer Vision, vol. 2, 2001, pp. 6.

Huang, et al., "LFW Results using a Combined Nowak plus MERL Recognizer", Retrieved at <<http://www.cs.umass.edu/~elm/papers/Huang_eccv2008-merlnowak.pdf>>, Faces in Real-Life Images Workshop in European Conference on Computer Vision (ECCV), 2008, pp. 1-2.

(Continued)

Primary Examiner — Brian P Werner

(57) ABSTRACT

Techniques for face verification are described. Local binary pattern (LBP) features and boosting classifiers are used to verify faces in images. A boosted multi-task learning algorithm is used for face verification in images. Finally, boosted face verification is used to verify faces in videos.

18 Claims, 8 Drawing Sheets

OTHER PUBLICATIONS

Huang, et al., "Towards Unconstrained Face Recognition", Retrieved at <<http://ieeexplore.ieee.org/stamp/stamp.jsp?arnumber=4562973&isnumber=4562948>>, IEEE Computer Society Conference on Computer Vision and Pattern Recognition Workshops, Jun. 23-28, 2008, pp. 8.

Huang, et al., "Labeled Faces in the Wild: A Database for Studying Face Recognition in Unconstrained Environments", Retrieved at <<http://www.tamaraberg.com/papers/lfw.pdf>>, Faces in Real-Life Images Workshop in European Conference on Computer Vision (ECCV), 2008, pp. 1-11.

Lu, et al., "Ensemble-based Discriminant Learning with Boosting for Face Recognition", Retrieved at <<http://www.dsp.utoronto.ca/juwei/Publication/BoostingLDAv13.pdf>>, Draft, Jul. 5, 2005, pp. 1-30.

Mason, et al., "Boosting Algorithms as Gradient Descent", Retrieved at <<http://www.lsmason.com/papers/NIPS00-DOOMII.pdf>>, In Advances in Neural Information Processing Systems 12, 2000, pp. 7.

Moghaddam, et al., "Bayesian Face Recognition", Retrieved at <<http://www.face-rec.org/algorithms/Bayes/TR2000-42.pdf, Pattern Recognition, vol. 33, No. 11, Nov. 2000, pp. 1771-1782.

Ojala, et al., "Multiresolution Gray-Scale and Rotation Invariant Texture Classification with Local Binary Patterns", Retrieved at <<http://ieeexplore.ieee.org/stamp/stamp.jsp?arnumber=1017623&isnumber=21893>>, IEEE Transactions on Pattern Analysis and Machine Intelligence, vol. 24, No. 7, Jul. 2002, pp. 971-987.

Caruana, Rich, et al., "Multitask Learning", Retrieved at <<http://www.cs.cornell.edu/~caruana/mlj97.pdf>>, School of Computer Science, Carnegie Mellon University, 1997, pp. 35.

Stone, et al., "Autotagging Facebook: Social Network Context Improves Photo Annotation", Retrieved at <<http://www.eecs.harvard.edu/~zickler/papers/Autotag_IVW2008.pdf>>, IEEE Computer Society Conference on Computer Vision and Pattern Recognition Workshops, Jun. 23-28, 2008, pp. 8.

Torralba, et al., "Sharing Visual Features for Multiclass and Multiview Object Detection", Retrieved at <<http://people.csail.mit.edu/torralba/publications/sharing.pdf>>, IEEE Transactions on Pattern Analysis and Machine Intelligence, vol. 19, No. 5, May 2007, pp. 1-16.

Turk, et al., "Eigenface for Recognition", Retrieved at http://www.face-rec.org/algorithms/PCA/jcn.pdf>>, Journal of Cognitive Neuroscience, vol. 3, No. 1, Jan. 2001, pp. 71-86.

Verschae, et al., "Face Recognition in Unconstrained Environments: A Comparative Study", Retrieved at <<http://hal.archives-ouvertes.fr/docs/00/32/67/30/PDF/Verschae_Ruiz-del-Solar_Correa_ECCV08_LFW_CameraReady.pdf>>, Workshop on Faces in 'Real-Life' Images: Detection, Alignment, and Recognition, Marseille, Oct. 2008, pp. 12.

Viola, et al., "Robust Real-Time Face Detection", Retrieved at <<http://www.cs.unc.edu/~lazebnik/spring09/viola_jones.pdf>>, International Journal of Computer Vision, vol. 57, No. 2, 2004, pp. 137-154.

Wiskott, et al., "Face Recognition by Elastic Bunch Graph Matching", Retrieved at <<http://www.face-rec.org/algorithms/EBGM/WisFelKrue99-FaceRecognition-JainBook.pdf>>, In Intelligent Biometric Techniques in Fingerprint and Face Recognition, 1999, pp. 1-23.

Wolf, et al., "Descriptor based Methods in the Wild", Retrieved at <<http://www.openu.ac.il/home/hassner/projects/Patchlbp/WolfHassnerTaigman_ECCVW08.pdf>>, Post ECCV workshop on Faces in Real-Life Images: Detection, Alignment, and Recognition, Oct. 17-18, 2008, pp. 1-14.

Yagnik, et al., Learning People Annotation from the Web via Consistency Learning, Retrieved at <<http://portal.acm.org/ft_gateway.cfm?id=1290121&type=pdf&coll=GUIDE&dl=GUIDE&CFID=19688763&CFTOKEN=7638277>>, ACM SIGMM International Workshop on Multimedia Information Retrieval, Sep. 28-29, 2007, pp. 285-290.

Yang, et al., "Face Recognition Using Ada-Boosted Gabor Features", Retrieved at <<http://www.cbsr.ia.ac.cn/users/szli/papers/YP-FG2004.pdf>>, In Proceedings of the Sixth IEEE International Conference on Automatic Face and Gesture Recognition, May 17-19, 2004, pp. 6.

Zhang, et al., "Boosting Local Binary Pattern (LBP)-based Face Recognition", Retrieved at <<http://www.springerlink.com/content/u9379ahmddj4b4qp/fulltext.pdf>>, Advances in Biometric Person Authentication, In Proceedings of the 5th Chinese Conference on Biometric Recognition, SINOBIOMETRICS 2004, Dec. 13-14, 2004, pp. 179-186.

* cited by examiner

| | |
|---|---|
| 1: | Input an image training set $A = \{x_1^a, \ldots, x_{N_a}^a\}$ of celebrity C, an image training set $B = \{x_1^b, \ldots, x_{N_b}^b\}$ of other celebrities excluding C, feature candidates $F = \{f_1, \ldots, f_L\}$, and distance measure of features $d(f(x_1), f(x_2))$. |
| 2: | Output $h(x_1, x_2)$, a similarity score of whether the two images $x_1$ and $x_2$ are from celebrity C or not. |
| 3: | Initialize weights $w_{1,i,j}^a = \frac{2}{N_a(N_a-1)}$ with $1 \leq i \leq j < N_a$, and $w_{1,i,j}^b = \frac{1}{N_a N_b}$ with $1 \leq i \leq N_a, 1 \leq i \leq N_b$. |
| 4: | for t = 1, ..., T do |
| 5: | Normalize the weights, $$w_{t,i,j}^a \leftarrow \frac{w_{t,i,j}^a}{\sum_{i',j'} w_{t,i',j'}^a + \sum_{i',j'} w_{t,i',j'}^b}$$ $$w_{t,i,j}^b \leftarrow \frac{w_{t,i,j}^b}{\sum_{i',j'} w_{t,i',j'}^a + \sum_{i',j'} w_{t,i',j'}^b}$$ |
| 6: | For each $f_k$ train a threshold $\rho_k$, minimizing error, $$\epsilon_k = \frac{1}{2}\left\{ \sum_{i,j} w_{t,i,j}^a \left(1 - S\left(d\left(f_k\left(x_i^a\right), f_k\left(x_j^a\right)\right), \rho_k\right)\right) \right.$$ $$\left. + \sum_{i,j} w_{t,i,j}^b \left(1 + S\left(d\left(f_k\left(x_i^a\right), f_k\left(x_j^b\right)\right), \rho_k\right)\right) \right\},$$ where $S(z, \rho) = 1$ if $z \leq \rho$ and -1, otherwise. |
| 7: | Choose the feature $f_t$ with the lowest error $\epsilon_t$. |
| 8: | Update the weights: $$w_{t+1,i,j}^a = w_{t,i,j}^a \beta_t^{1-e_{i,j}^a}, w_{t+1,i,j}^b = w_{t,i,j}^b \beta_t^{1-e_{i,j}^b}$$ where $e_{i,j}^a = 0$ if $d\left(f_t\left(x_i^a\right), f_t\left(x_j^a\right)\right) \leq \rho_t$, and 1, otherwise; $e_{i,j}^b = 0$ if $d\left(f_t\left(x_i^a\right), f_t\left(x_j^b\right)\right) > \rho_t$, and 1, otherwise; and $\beta_t = \frac{\epsilon_t}{1-\epsilon_t}$. |
| 9: | end for |
| 10: | $h(x_1, x_2) = \sum_{t=1}^T \alpha_t S\left(d\left(f_t\left(x_1\right), f_t\left(x_2\right)\right), \rho_t\right)$, where $\alpha_t = \log\frac{1}{\beta_t}$. |

FIG. 4

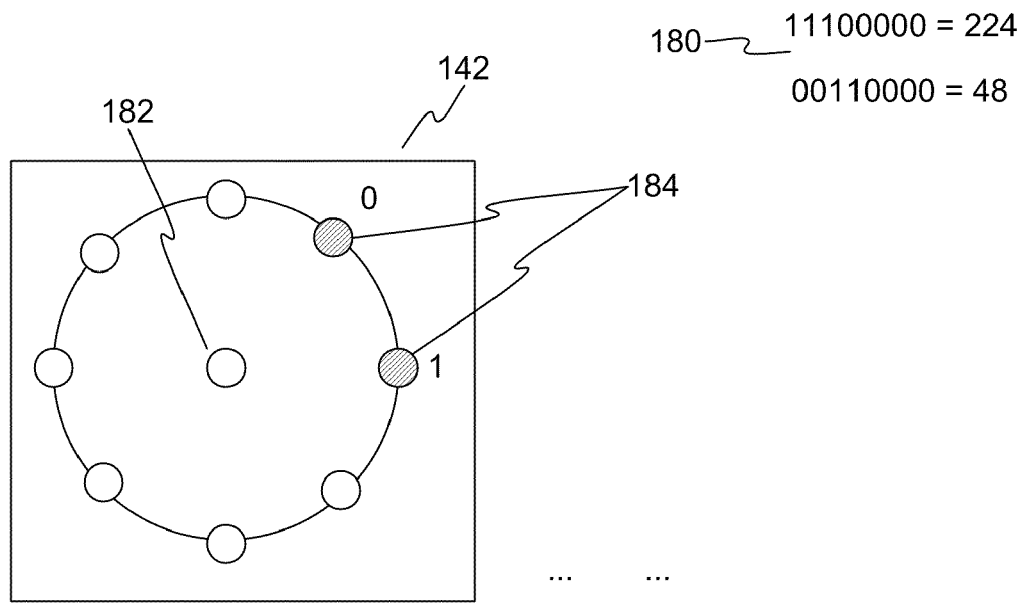
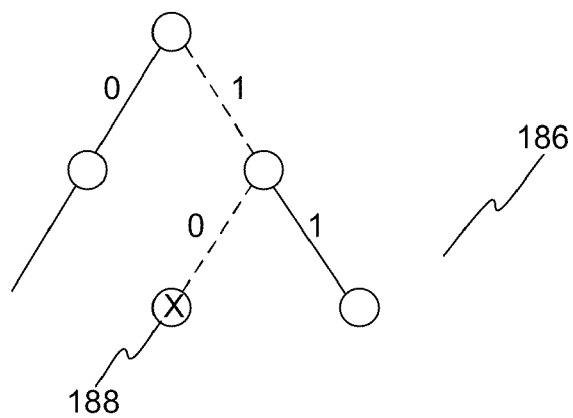
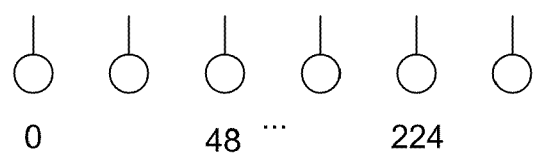
FIG. 5

| | |
|---|---|
| 1: | Input training sets of $M$ individuals, $\{\Delta_1, \ldots, \Delta_M\}$ where $\Delta_m = \{(\xi_{m,n}, y_{m,n})\}$, candidate features $F = \{f_1, \ldots, f_L\}$, and the number of components $K$ in the mixture. |
| 2: | Output $M$ binary classifiers of $m$ celebrities. A classifier classifies whether two examples $x_1$ and $x_2$ are from the same celebrity $m$ or not. |
| 3: | Randomly assign a value from 1 to $K$ to $c_m$. $q_{m,k} = 1$ if $c_m = k$, and 0, otherwise. |
| 4: | Initialize weights. If $c_m = k$, $w_{k,m,n} = \frac{1}{N_m^+}$ if $y_{m,n}=1$, and $-\frac{1}{N_m^-}$, otherwise. $N_m^+$ and $N_m^-$ are the numbers of $y_{m,n}=1$ and $y_{m,n}=0$ in $\Delta_m$. If $c_m \neq k$, $w_{k,m,m} = 0$. |
| 5: | for t = 1, ..., T do |
| 6: |   for k = 1, ..., K do |
| 7: |     normalize weights such that $\sum_{m,n} |w_{k,m,n}| = 1$. |
| 8: |   end for |
| 9: |   for k=1, ..., K do |
| 10: |     Search for a best feature $f_{k,t}$ and its optimal threshold $\rho_{k,t}$ to maximize $\sum_{m,n} w_{k,m,n} h_{k,t+1}(\xi_{m,n})$, where $h_{k,t+1}$ is defined in Eq. (4). |
| 11: |     Search for $\alpha_{k,t}$ maximizing $C_k^{(t+1)}$ in Eq. (10). |
| 12: |   end for |
| 13: |   Update $\eta_k$ using Eq. (8). |
| 14: |   Update $q_{m,k}$ using Eq. (7). |
| 15: |   Update $w_{k,m,n}$ using Eq. (11) and (12). |
| 16: | end for |
| 17: | $\{h_k\}$ are given by Eq. (3). |
| 18: | The classifier of celebrity $m$ is given by Eq. (13). |

FIG. 7

BOOSTED FACE VERIFICATION

BACKGROUND

Images and video about people, in particular celebrities, are frequently searched on the worldwide web. Current search engines mostly use text information near images/videos, for example, in a same web page, to perform image/video searches. Although the top returned examples of this approach are often satisfactory, lower ranked examples are often inaccurate.

For instance, if "Eva Longoria" is used as the keyword to query from YouTube, a high ranked result does not show Eva Longoria but rather shows a video about imitating the hair style of Eva Longoria. In addition, for celebrity videos, it would improve search accuracy to know when and how often a celebrity appears in a video. For example, people may be more interested in a music video of Eva Longoria than a video clip of a news program where she is only shown briefly. In these scenarios, face recognition may improve video search results.

Techniques described herein relate to techniques for performing face verification and using face verification to improve searches for video.

SUMMARY

The following summary is included only to introduce some concepts discussed in the Detailed Description below. This summary is not comprehensive and is not intended to delineate the scope of the claimed subject matter, which is set forth by the claims presented at the end.

Described below are techniques for face verification. Face verification involves determining whether an image (or video frame) includes a face of a known identity. A framework for face verification using local binary pattern (LBP) features and boosting classifiers is described. A boosted multi-task learning algorithm for face verification is then described. Finally, a technique for boosted face verification in videos is explained.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 4 shows an algorithm which is an adaptation of the AdaBoost algorithm for face verification.

FIG. 5 shows an example of tree-based computation of LBP features.

FIG. 7 shows an algorithm for boosted multi-task learning for face verification.

DETAILED DESCRIPTION

Overview

Embodiments described below relate to, given a small set of known face images of a person (for example the top results of a celebrity from a text-based search engine), verifying whether the person is in other images or videos, for example those returned by a search engine. For illustration, embodiments will be described with reference to celebrities. However, the techniques described herein are applicable to any person, and wherever "celebrity" is used, "person" may be substituted.

First, a framework is proposed for face verification using Local Binary Pattern (LBP) features and boosting classifiers. By selecting discriminative features from a large set of LBP features using boosting, the verification accuracy, for example using an LBP-based face recognizer can be improved. These LBP features can be computed efficiently through early rejection of certain LBP features as they are being computed, which may reduce computation.

Second, a boosted Multi-Task Learning (Boosted MTL) algorithm is described. Because positive training examples are sometimes obtained from the top query results from text-based search engines, the size of the training data set may be limited. Consequently, a machine learning algorithm may easily overfit on the training data set. Boosted MTL may be used to address overfitting. K boosting classifiers are learned jointly for M celebrities, where $M \geq K$. A combined classifier—a mixture of the K classifiers—is composed for each celebrity. Celebrities who have commonality in their features might be explained by the same boosting classifiers, while those who do not have commonality might have a different mixture of the K boosting classifiers.

Third, a boosted learning algorithm tailored to verification of faces in videos is discussed.

LBP Features for Boosting

Introduction to LBP

Figure 1:
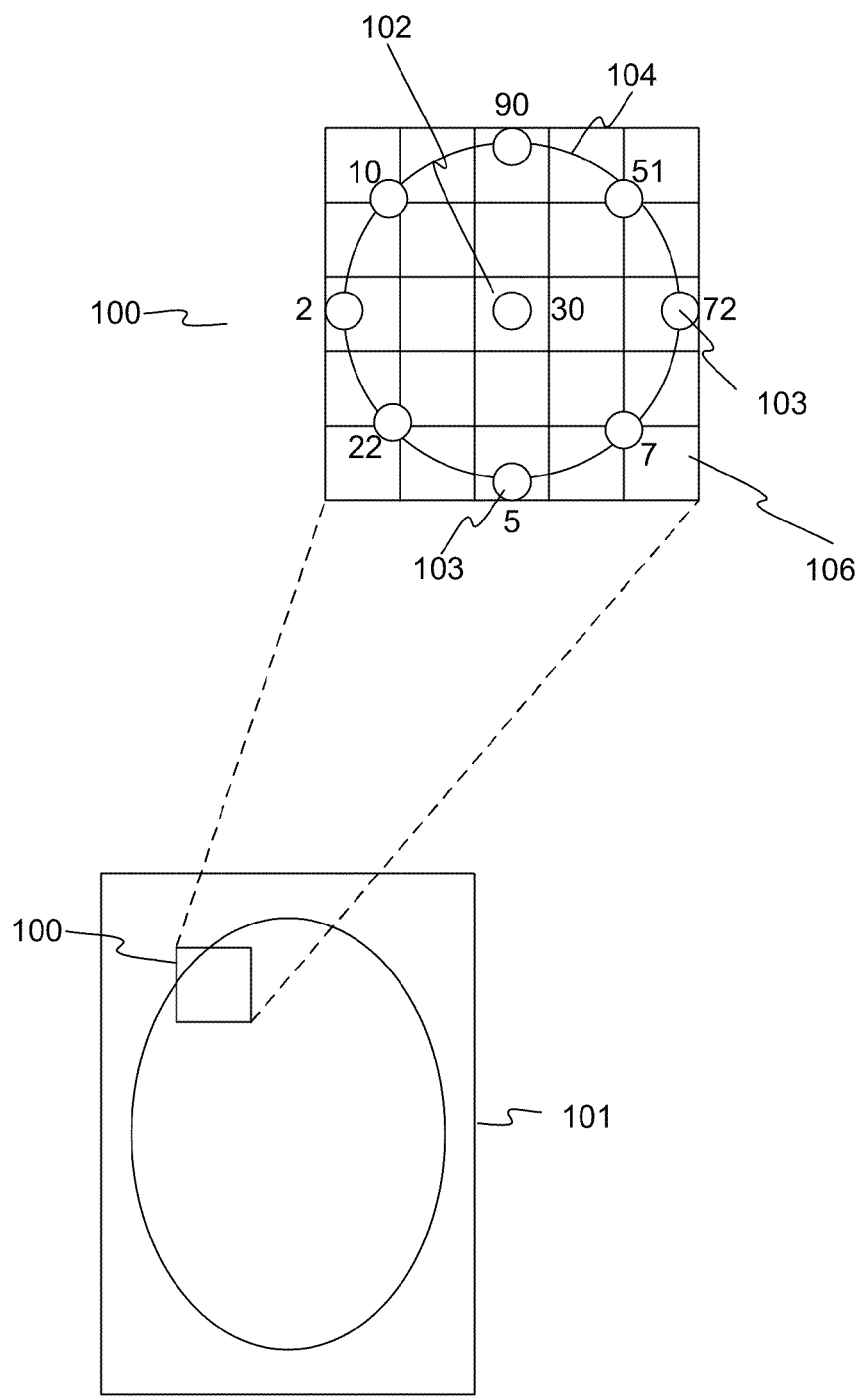
FIG. 1 shows a neighborhood for a local binary pattern.

LBP is an image texture descriptor described in detail elsewhere (see T. Ojala, M. Pietikainen, and T. Maenpaa; "Multiresolution gray-scale and rotation invariant texture classification with local binary patterns"; IEEE Trans. on PAMI, 24:971-987, 2002). FIG. 1 shows a neighborhood 100 for an LBP, for a given image 101 of a person's face. The neighborhood 100 is of a pixel i 102 and is obtained by uniformly sampling P pixels 103 along the circle 104 centered at pixel i 102 with radius R. If the pixels in the neighborhood 100 do not fall on the grid 106, their values may be estimated using bilinear interpolation or other means. The pixels in the neighborhood 100 are assigned binary numbers by thresholding against the value of pixel i (e.g., a pixel is compared to pixel i). In one embodiment, thresholding is performed by checking the value x of the center pixel; when a neighbor pixel has a value greater than x, the threshold value for the pixel is 1, otherwise it is 0. More complex variations may be used, but in general the threshold value for the pixel involves comparing the value of the pixel with the value of the center pixel. It should be noted that learning techniques described herein can also be used with other types of features besides LBP features. For example, Gabor wavelet coefficients may be used.

Figure 2:
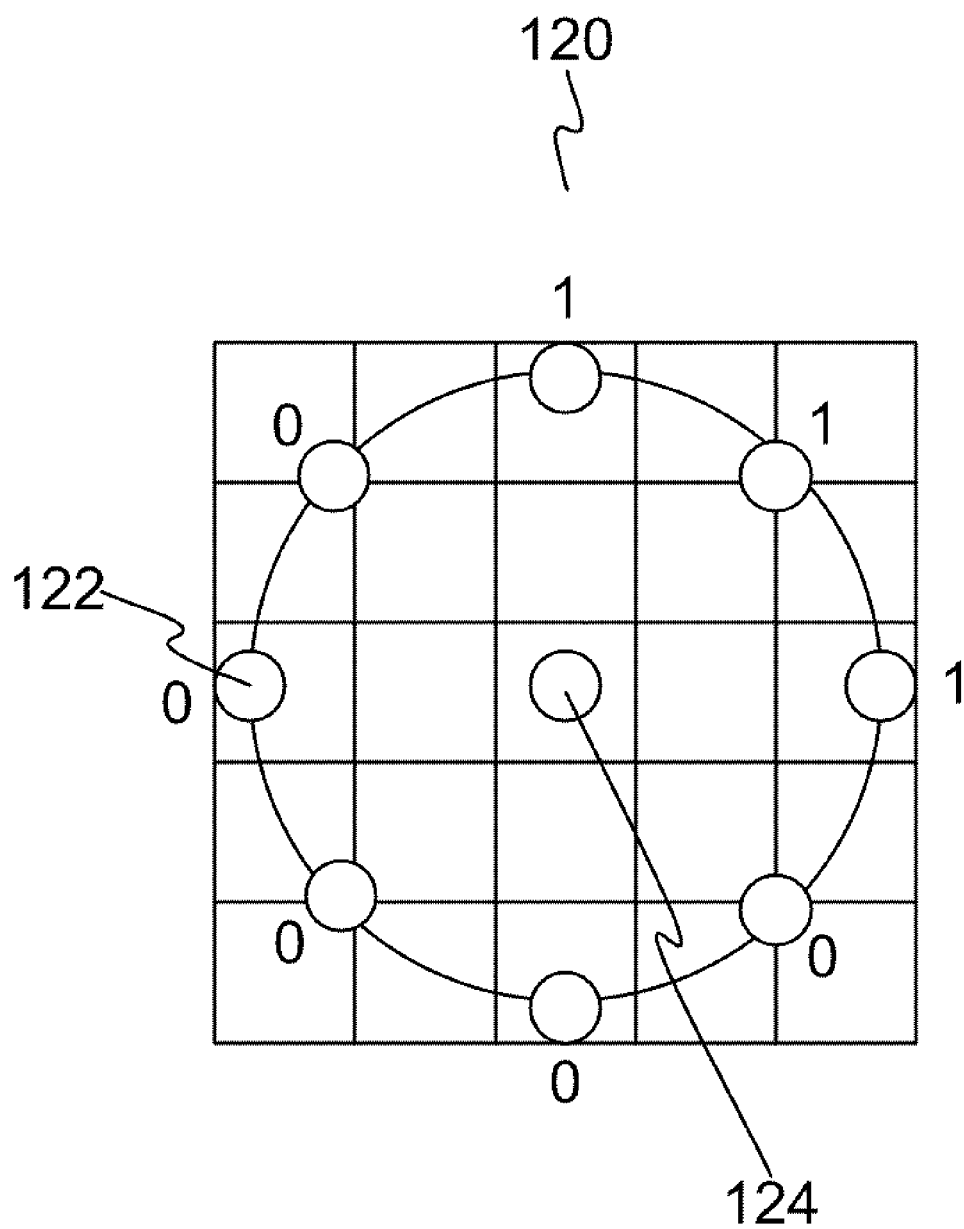
FIG. 2 shows an example local binary pattern.

FIG. 2 shows thresholding of a neighborhood 120, where pixels 122 are assigned a value of 0 or 1, according to a threshold relative to the pixel i 124. These binary numbers are then assembled into a number such as an integer, which is used as a label or the local binary pattern (LBP) of pixel i. In the example local binary pattern of FIG. 2, the center pixel i 124 will be labeled as 11100000=224 (here, label refers to the labeling of training data for machine learning). A local binary pattern is called uniform if it contains at most two bitwise transitions from 0 to 1 (or vice versa) when the binary string is considered circular. For example, 00000000, 00011110 and 10000011 are uniform patterns, but 00010100 is not.

One extension or embodiment of LBP based learning is to retain only patterns that are uniform and map the non-uniform patterns to a single label. Uniform patterns may appear more frequently than non-uniform patterns, and in some cases, such an extension of LBP might increase robustness over noise and improve computational efficiency. Uniform patterns may sometimes characterize edges with particular directions, lengths and scales. As used herein, the operator of uniform patterns will be denoted as LBP-u2-PR. The operator can generate different patterns for different values of P, and/or R (P and R are explained below), among other possible variables.

Figure 3:
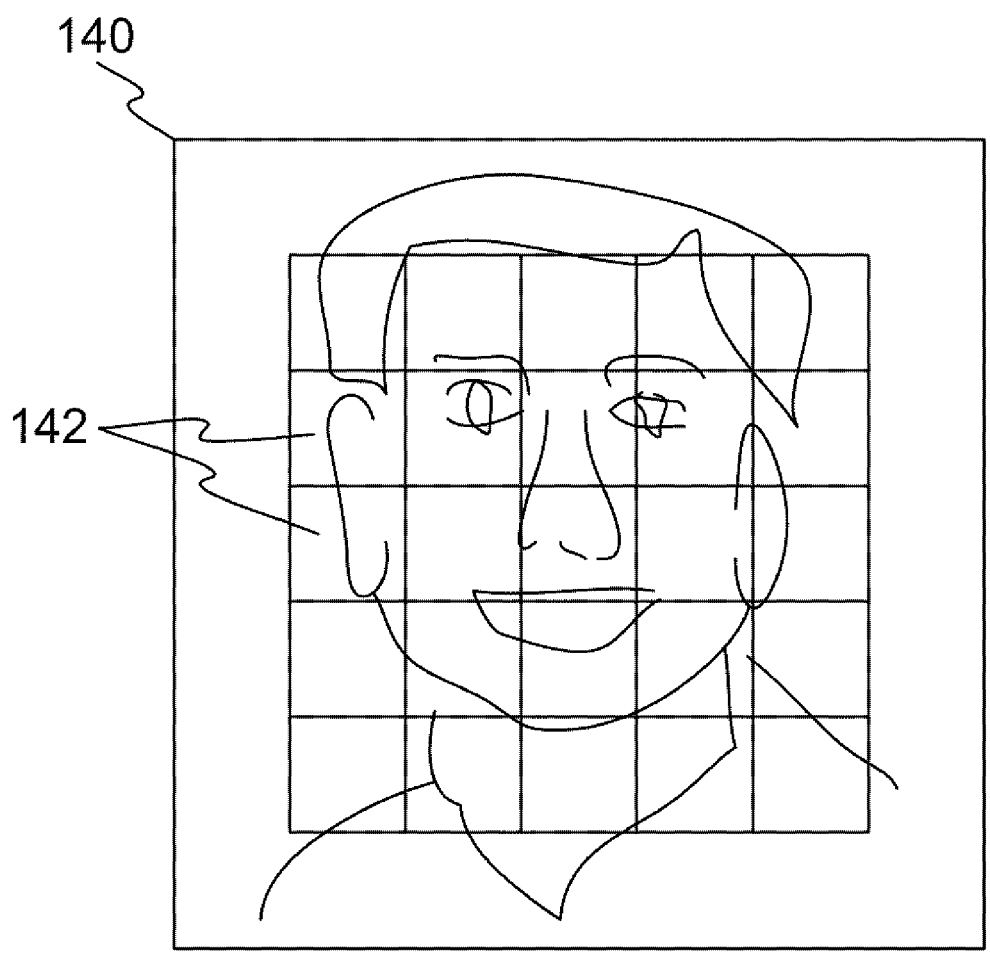
FIG. 3 shows an image of a face divided into regions.

FIG. 3 shows an image 140 of a face divided into regions 142. The histograms of uniform patterns inside the regions 142 (i.e., counts of the uniform patterns) may be used as features for face recognition. With LBP, if there are P pixels uniformly sampled along the circle, there will be 3P(P−1) uniform patterns. When choosing different P and R (P being the number of pixels uniformly sampled along the circle of radius R) different uniform patterns can be computed. As described below, boosting may be used to select a small set of preferred uniform patterns to be used for face verification.

LBP for Boosting

FIG. 4 shows an algorithm 160 which is an adaptation of the AdaBoost algorithm for face verification. The AdaBoost algorithm is described n greater detail elsewhere (see, e.g., A. Freund and R. E. Schapire; "A decision-theoretic generalization of on-line learning and an application to boosting"; In Proceedings of European Conference on Computational Learning Theory; 1995). Given a set of positive examples $A=\{x_1^a, \ldots, x_{N_a}^a\}$ of celebrity C (known images of C, or, images labeled as C) and a set of negative example images $B=\{x_1^b, \ldots, x_{N_b}^b\}$ of other celebrities excluding C, a similarity score $h(x_1, x_2)$ is learned, which is large if both $x_1$ and $x_2$ belong to C, and small otherwise. From sets A and B, a training data set is composed, where positive examples are pairs of examples that are both from set A, i.e., $\{x_i^a, x_j^a\}$, and negative examples are pairs of examples that are from both set A and B, i.e., $\{x_i^a, x_j^b\}$. The similarity between a testing image X and A, computed as $$h_{max} = \max_{x_i^a \in A} h(x_i^a, x) \quad (1)$$

is used as a measure to verify whether x belongs to celebrity C or not. In other words, the test image is compared with all the example images of celebrity C and the highest score is used to make the decision.

In algorithm 160, $F=\{f_1, \ldots, f_L\}$ is a large pool of candidate features. The value of $f_j$=LBP-u2-PR(E, k) is the count of the k-th bin of the histogram of uniform patterns inside local region E. The features in F are computed using different LBP operators by choosing different P and R values, and using different sizes of local regions. The distance between two bin features may be computed as $$d(f(x_1), f(x_2)) = \frac{(f(x_1) - f(x_2))^2}{f(x_1) + f(x_2)}. \quad (2)$$

Fast Computation of LBP Bin Features

Algorithm 160 is an adaptation of the AdaBoost algorithm that uses LBP bin features. The LBP bin features can be computed efficiently by using early termination. That is, a costly part of computing LBP features lies in estimating the values of pixels on the circle using bilinear interpolation. The bins selected by the AdaBoost algorithm distribute among multiple—perhaps many—different local regions. On average, only the counts of one or two bins inside a local region need to be computed. Instead of labeling every pixel with a local binary pattern, it is possible to verify whether a pixel belongs to the local binary patterns of interest or not. Many pixels may be discarded (terminated early) after examining the first pixels in their neighborhood, thus avoiding estimating all the pixels in the neighborhood. This procedure can be implemented using a binary tree. An example is shown in FIG. 5.

FIG. 5 shows an example of tree-based computation of LBP features. For a local region 142, only two local binary patterns 180, 11100000 and 000110000, have been previously selected by AdaBoosting (as sufficiently relevant). For a pixel 182 inside local region 142, after estimating the values of the first two pixels 184, which have binary number '10', in its neighborhood, it is possible to decide that this pixel 182 does not belong to any of the two local binary patterns and stop estimating other pixels in its neighborhood. This procedure can be easily implemented by a binary search tree 186, where the search terminates when a non-matching node 188 is encountered (the dotted lines represent the search path).

Boosted Multi-Task Learning

As mentioned earlier, it is assumed that for each celebrity being learned, a small number of training examples are available for learning. Such samples may be from a text-based search engine, manually supplied, obtained from pre-existing labeled datasets, etc. If individual classifiers are learned for each celebrity, overfitting is likely. An alternative approach is to train a generic classifier which classifies whether or not any two example images are images of the same person. A positive training set $\{\xi+i=(x_{i1}, x_{i2})\}$, in which $(x_{i1}, x_{i2})$ are a pair of examples from the same person, and a negative set $\{\xi-i=(x_{i1}, x_{i2})\}$, where two example images in a pair of the positive training set are from two different celebrities, and are used to train a binary classifier. This classifier is used to verify any arbitrary person. It should be noted that a classifier is any computer-implemented algorithm that determines whether a test input is a member of a classification. Many known approaches such as Bayesianface and AdaBoost face recognition (both described elsewhere) may be used with this scheme. In some scenarios, this approach can effectively reduce the chance of overfitting, because the positive and negative training sets can be large. However, when only a single classifier is built to recognize all the faces, the recognition performance is usually not satisfactory, as was confirmed by empirical testing. In view of this, an algorithm called Boosted Multi-Task Learning (MTL) is now described.

Multi-task learning is a general machine learning approach in which a problem is learned together with other related problems at the same time using a shared representation. MTL may sometimes provide a better model for a single task than a model learned independently, because MTL allows the learner (learning machine, learning algorithm, etc.) to use the commonality among related problems or tasks. In the present embodiment, the tasks are the verifications of multiple celebrities. Assuming there are M celebrities to be verified. A celebrity m has $N_{a_m}$ training examples, which are $$A_m = \{x_1^{a_m}, \ldots, x_{N_{a_m}}^{a_m}\}.$$

Another set may be assumed—$B_m=\{x_n^b, \ldots, x_{N_b}^b\}$—which includes training examples of other people excluding the M celebrities in $A_m$. For each celebrity m in $A_m$, a training set $\{(\xi_{m,n}, y_{m,n})\}$ is built, where $\xi_{m,n}=(x_{m,n,1}, x_{m,n,2})$ is a pair of image examples, $y_{m,n}=1$ if both $x_{m,n,1}$ and $x_{m,n,2}$ are in $A_m$, and $y_{m,n}=0$ if $x_{m,n,1} \in A_m$ and $x_{m,n,2} \in B$.

Figure 6:
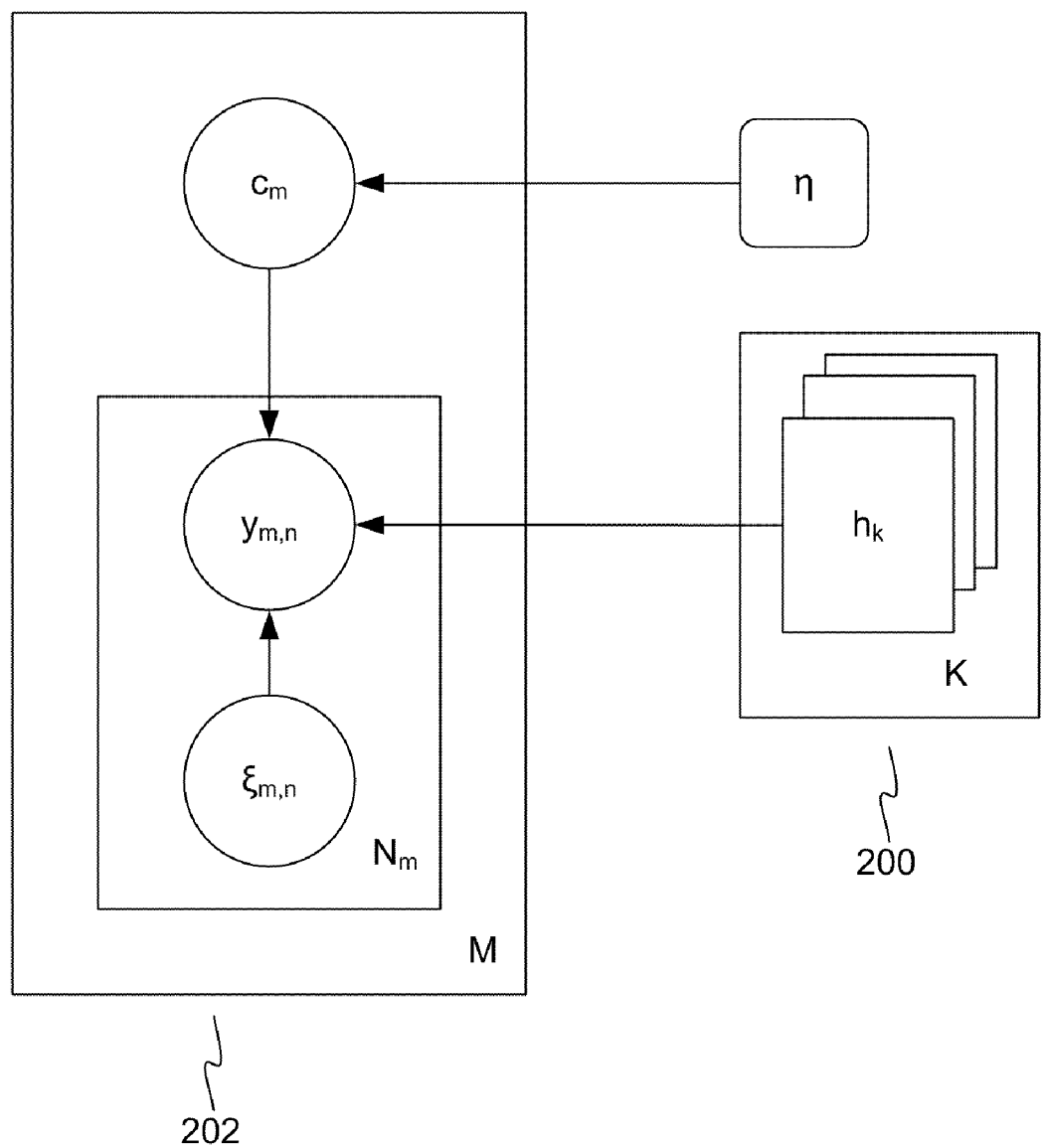
FIG. 6 shows components of a boosted multi-task learning algorithm.

FIG. 6 shows components of the Boosted MTL algorithm. There are K boosting classifiers $\{h_k\}$ 200 to be learned, and there are M celebrities 202 to be verivied, where $K \leq M$.

The boosting classifiers 200 are in the following form:

$$h_k(\xi_{m,n}) = \sum_{t=1}^{T} \alpha_{k,t} h_{k,t}(\xi_{m,n}) \quad (3)$$

$$h_{k,t}(\xi_{m,n}) = S(d(f_{k,t}(x_{m,n,1}, x_{m,n,2})), \rho_{k,t}),$$

$$p(\{y_{m,n}\} | \{\xi_{m,n}\}, \{h_k\}, \eta) \quad (4)$$

where $S(z, \rho) = 1$ if $z < \rho$, and $-1$ otherwise. Also, $\eta$ is a multinomial hyperparameter. For a given celebrity m, the model samples a boosting classifier indexed as $c_m \in \{1, \ldots, K\}$ based on the conditional probability $p(c_m | \eta)$, and uses $h_{c_m}$ to predict $y_{m,n}$ given $\xi_{m,n}$. The joint distribution is $$\Pi_m \Sigma_{c_m} \Pi_n p(y_{m,n} | \xi_{m,n}, h_{c_m}) p(c_m | \eta) \quad (5)$$

where $$p(y | \xi, h_k) = \left(\frac{1}{1 + \exp(-h_k(\xi))}\right)^y \left(\frac{\exp(-h_k(\xi))}{1 + \exp(-h_k(\xi))}\right)^{1-y} \quad (6)$$

An EM algorithm can be used to learn $\{h_k\}$ and $\eta$.

E-Step:

$$q_{m,k}^{(t)} = p(c_m = k | \{y_{m,n}\}, \{\xi_{m,n}\}, \{h_k^{(t)}\}, \eta^{(t)}) \quad (7)$$

$$= \frac{\eta_k^{(t)} \prod_n P(y_{m,n} | \xi_{m,n} h_k^{(t)})}{\sum_{k'=1}^{K} \eta_{k'}^{(t)} \prod_n p(y_{m,n} | \xi_{m,n} h_{k'}^{(t)})}$$

M-Step:

$$\eta_k^{(t+1)} \propto \Sigma_m q_{m,k}^{(t)} \quad (8)$$

$$h_k^{(t+1)} = \arg\max_{h_k} \Sigma_{m,n} q_{m,k}^{(t)} \log[p(y_{m,n} | \xi_{m,n}, h_k)] \quad (9)$$

To solve Equation (9), the object function of boosting is $$c_k^{(t+1)} = \sum_{m,n} q_{m,k}^{(t)} \left[ \begin{array}{c} y_{m,n} \log \frac{1}{1 + \exp(-h_k(\xi_{m,n}))} + \\ (1 - y_{m,n}) \log \frac{\exp(-h_k(\xi_{m,n}))}{1 + \exp(-h_k(\xi_{m,n}))} \end{array} \right] \quad (10)$$

Let $h_k^{t+1} = h_k^{(t)} + \alpha_{k,t+1} h_{k,t+1}$. Following the AnyBoost approach (described elsewhere), the weight on each example is given as the derivative of the cost function with respect to a change in the score of the example. Then, if $y_{m,n}=1$, $$\frac{\partial C_k^{t+1}}{\partial h_k(\xi_{m,n})} = w_{k,m,n} = q_{m,k}^{(t)} \frac{\exp(-h_k^{(t)}(\xi_{m,n}))}{1 + \exp(-h_k^{(t)}(\xi_{m,n}))} \quad (11)$$

If $y_{m,n} = 0$, $$\frac{\partial C_k^{t+1}}{\partial h_k(\xi_{m,n})} = w_{k,m,n} = q_{m,k}^{(t)} \frac{1}{1 + \exp(-h_k^{(t)}(\xi_{m,n}))} \quad (12)$$

then $h_{k,t+1}$ can be found by maximizing $\Sigma_{m,n} w_{k,m,n} h_{k,t+1} (\xi_{m,n})$.

After $h_k$ and $\eta$ have been learned by EM, the classifier of celebrity m is given by $$p(y_{new} | \xi_{new}, \{(\xi_{m,n}, y_{m,n})\}, \{h_k\}, \eta) = \sum_{k=1}^{K} p(y_{new} | \xi_{new}, h_k) \quad (13)$$

$$p(h_k | \{(\xi_{m,n}, y_{m,n})\}, \{h_k\}, \eta)$$

$$= \sum_{k=1}^{K} q_{m,k} p(y_{new} | \xi_{new}, h_k)$$

FIG. 7 shows an algorithm 220 which is a summary of the algorithm described above.

With Boosted MTL, celebrities which have commonality in feature selection are clustered and share training data. The posterior $q_{m,k}$ indicates how well a boosting classifier $h_k$ fits the training data of celebrity m. From Equations (10), (11) and (12), if $h_k$ cannot explain the training data of celebrity m well, the training data of m has less contribution to the learning of $h_k$ since the weight of each example is multiplied by $q_{m,k}$. Rather than training M boosting classifiers for M, K boosting classifiers are learned, so overfit is less likely. On the other hand, as shown in Equation (13), the training data of each celebrity can be explained by properly linearly combining the K boosting classifiers. Instead of requiring all the celebrities to share training data as training a generic boosting classifier, in Boosted MTL, a set of celebrities share training data only when their training data can be well explained by the same boosting classifier. If K is smaller, the trained classifiers are less likely to overfit. The smallest K can be chosen which provides accuracy on the training data above a threshold.

Face Verification in Videos

Compared to images, faces in videos are often of lower resolution, exhibit more compression artifacts, have more pose variations, and have more dramatic variation in lighting conditions. Described next is a multi-stage boosting algorithm for verification of faces in videos. First a small set of face examples are found in videos with high confidence and then more examples are included from videos through face tracking. The face examples from the videos are used to retrain the boosting classifier.

Figure 8:
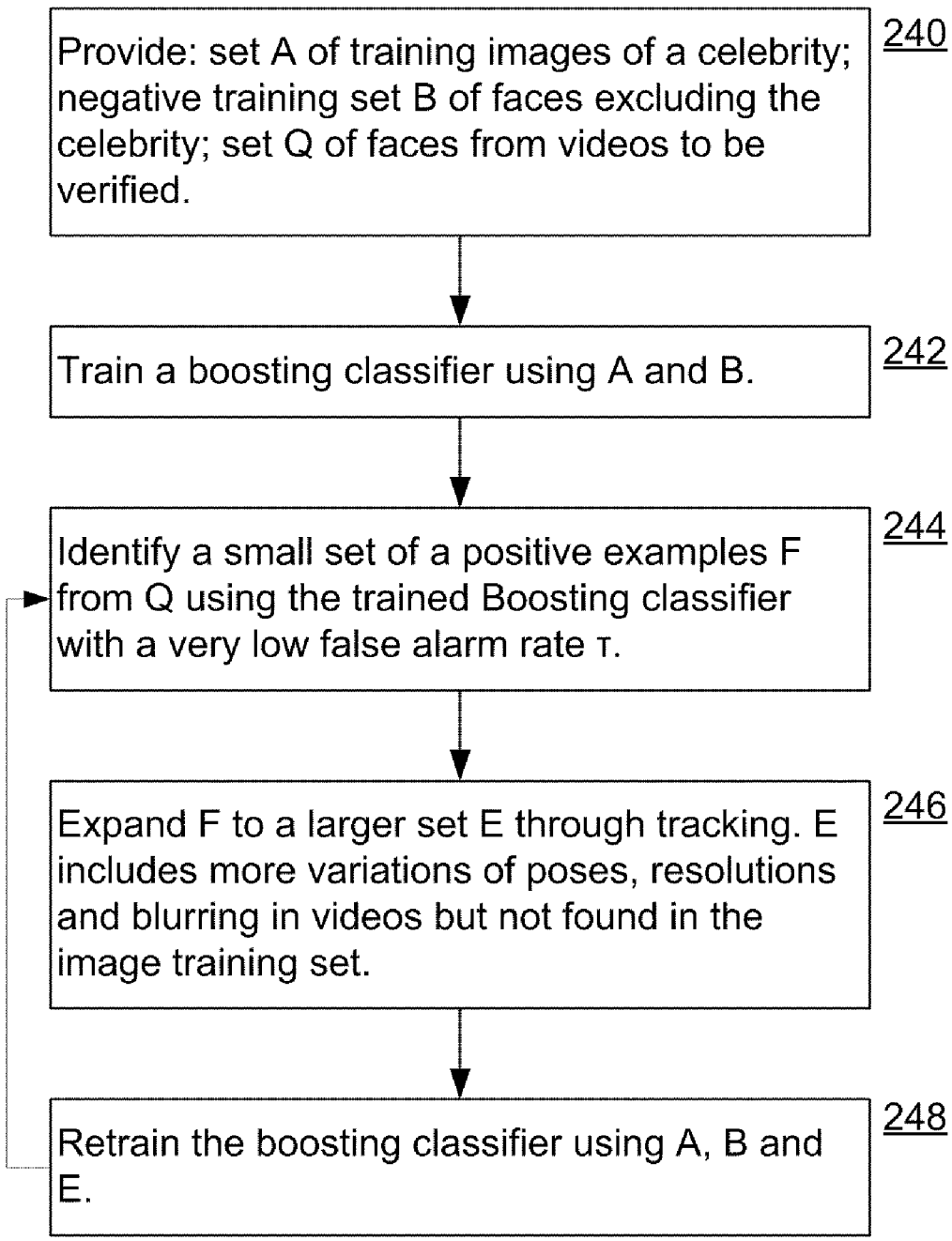
FIG. 8 shows a process for extending multi-stage boosting.

FIG. 8 shows a process for extending multi-stage boosting. Training sets A, B, and faces Q are provided 240. Note that set B may be obtained without much labeling effort and can be used to train the classifiers of different celebrities. A boosting classifier is trained 242 using sets A and B. A small set of positive examples F is identified 244 from Q using the trained Boosting classifier. Example set F is expanded 246 through tracking, and the boosting classifier is retrained 248. The identifying 244, expanding 246, and retraining 248 are repeated as needed, for example, several 2-10 times.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method for determining whether an image is an image of a particular person, the method comprising:
    receiving an input image;
    computing a plurality of local patterns of the input image, each local pattern corresponding to a different pixel neighborhood of a different pixel in the input image, wherein when computing a local pattern for a neighborhood, pixels in the neighborhood are analyzed to determine if they match previously selected local patterns, and when a pixel is determined to not match any of the previously selected local patterns, computation of the local pattern is terminated; and
    using counts of the local patterns as features of a learning algorithm to determine whether or not the image is an image of the person.

2. A computer-implemented method according to claim 1, wherein the computing the plurality of local patterns is performed for each of a plurality of regions of the image, and a plurality of different types of local patterns are computed for each such region.

3. A computer-implemented method according to claim 1, wherein the local patterns comprise local binary patterns, and a local binary pattern comprises a string of bits each corresponding to pixel in a pixel neighborhood.

4. A computer-implemented method according to claim 3, wherein the learning algorithm comprises an implementation of the AdaBoost algorithm.

5. A computer-implemented method according to claim 1, wherein the local patterns are computed for target pixels of the image based on neighborhoods of the target pixels.

6. A computer-implemented method according to claim 5, wherein the neighborhoods vary in size and in the number of encompassed pixels of the image.

7. A computer-implemented method according to claim 1, wherein a local pattern comprises bits computed by comparing the value of a pixel at the center of the local pattern to values of pixels in the neighborhood of the pixel at the center.

8. A computer-implemented method according to claim 7, wherein the local patterns are used to compute scores of similarity between the input image and the images from a set of images of the person, and the scores are used to determine whether the image is an image of the person.

9. A computer-implemented method comprising:
    receiving a positive training set comprising images of a particular person, a negative training set comprising images of persons other than the particular person, and a set of images of faces from videos;
    using the negative training set to train classifiers of the persons other than the particular person;
    receiving a set of images of faces obtained from videos and training a boosting classifier therefrom; and
    using the trained boosting classifier to identify a subset of images from the set of images of faces;
    receiving an input image;
    computing a plurality of local patterns of the input image, each local pattern corresponding to a different pixel neighborhood of a different pixel in the input image; and
    using counts of the local patterns as features of a learning algorithm to determine whether or not the image is an image of the person.

10. A computer-implemented method according to claim 9, further comprising expanding the subset of images by tracking persons in the videos.

11. A computer-implemented method according to claim 10, further comprising retraining the boosting classifier using the positive training set, the negative training set, and the expanded subset of images.

12. A computer-implemented method according to claim 11, further comprising repeating the identifying, the expanding, and the retraining a plurality of times.

13. A computer-implemented method according to claim 12, further comprising determining whether the particular person is present in one of the videos.

14. One or more computer-readable storage media, wherein the one or more computer-readable storage media is not a signal, the one or more computer-readable storage media storing information to enable a computing device to perform a process, the process comprising:
    receiving an input image;
    computing a plurality of local patterns of the input image, each local pattern corresponding to a different pixel neighborhood of a different pixel in the input image, wherein when computing a local pattern for a neighborhood, pixels in the neighborhood are analyzed to determine if they match previously selected local patterns, and when a pixel is determined to not match any of the previously selected local patterns, computation of the local pattern is terminated; and
    using counts of the local patterns as features of a learning algorithm to determine whether or not the image is an image of the person.

15. One or more computer-readable storage media according to claim 14, wherein the computing the plurality of local patterns is performed for each of a plurality of regions of the image, and a plurality of different types of local patterns are computed for each such region.

16. One or more computer-readable storage media according to claim 14, wherein the local patterns comprise local binary patterns, and a local binary pattern comprises a string of bits each corresponding to pixel in a pixel neighborhood.

17. One or more computer-readable storage media according to claim 14, wherein the local patterns are computed for target pixels of the image based on neighborhoods of the target pixels.

18. One or more computer-readable storage media according to claim 14, wherein the local patterns are used to compute scores of similarity between the input image and the images from a set of images of the person, and the scores are used to determine whether the image is an image of the person.

* * * * *